(12) United States Patent
Gupta

(10) Patent No.: US 7,178,948 B2
(45) Date of Patent: Feb. 20, 2007

(54) LIGHT COLLECTION SYSTEM

(75) Inventor: Anurag Gupta, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 199 days.

(21) Appl. No.: 10/919,936

(22) Filed: Aug. 17, 2004

(65) Prior Publication Data
US 2006/0039153 A1 Feb. 23, 2006

(51) Int. Cl.
*F21V 7/00* (2006.01)

(52) U.S. Cl. .................... 362/298; 362/301; 362/560; 359/853

(58) Field of Classification Search ............... 362/298, 362/300, 301, 302, 560; 359/853, 858, 859
See application file for complete search history.

(56) References Cited

U.S. PATENT DOCUMENTS

| | | | |
|---|---|---|---|
| 3,427,447 A | 2/1969 | Clark | |
| 4,241,382 A | 12/1980 | Daniel | |
| 4,460,939 A | 7/1984 | Murakami et al. | |
| 4,871,249 A | 10/1989 | Watson | |
| 5,021,928 A | 6/1991 | Daniel | |
| 5,117,312 A | 5/1992 | Dolan | |
| 5,406,462 A | 4/1995 | Fallahi et al. | |
| 5,446,639 A | 8/1995 | Hamanaka et al. | |
| 5,509,095 A | 4/1996 | Baker et al. | |
| 5,574,328 A | 11/1996 | Okuchi | |
| 5,584,557 A | 12/1996 | Alexay | |
| 5,769,844 A | 6/1998 | Ghaffari et al. | |
| 5,833,341 A | 11/1998 | Kimura et al. | |
| 5,842,767 A | 12/1998 | Rizkin et al. | |
| 6,123,436 A | 9/2000 | Hough et al. | |
| 6,332,688 B1 | 12/2001 | Magarill | |
| 6,356,700 B1 | 3/2002 | Strobl | |
| 6,953,252 B2 * | 10/2005 | Way | 359/858 |
| 2002/0141192 A1 | 10/2002 | Tiao et al. | |
| 2002/0176255 A1 | 11/2002 | Yamauchi et al. | |
| 2005/0237764 A1 | 10/2005 | Jain | |

FOREIGN PATENT DOCUMENTS

| | | |
|---|---|---|
| EP | 0 691 552 A | 1/1996 |
| JP | 1-211705 | 8/1989 |
| JP | 3-168629 | 7/1991 |
| JP | 4-63321 | 2/1992 |
| JP | 5-12907 | 1/1993 |

* cited by examiner

Primary Examiner—Stephen F Husar
(74) Attorney, Agent, or Firm—Jeffrey B. Fromm

(57) ABSTRACT

A light collection system includes a substantially elliptical first reflector that defines first and second focal points on an axis. The first reflector has an annular region that encompasses the first focal point. The annular region has a width W that is the distance of its projection onto the axis in a direction perpendicular to the axis and the width W is less than or equal to about $\frac{1}{20}$ of a distance Df between the first and second focal points. A second reflector has an aperture through the second reflector on the axis. The second reflector is shaped and positioned to reflect electromagnetic radiation from the annular region on the first reflector back to the annular region for reflection to a different portion of the annular region and back to the aperture.

49 Claims, 12 Drawing Sheets

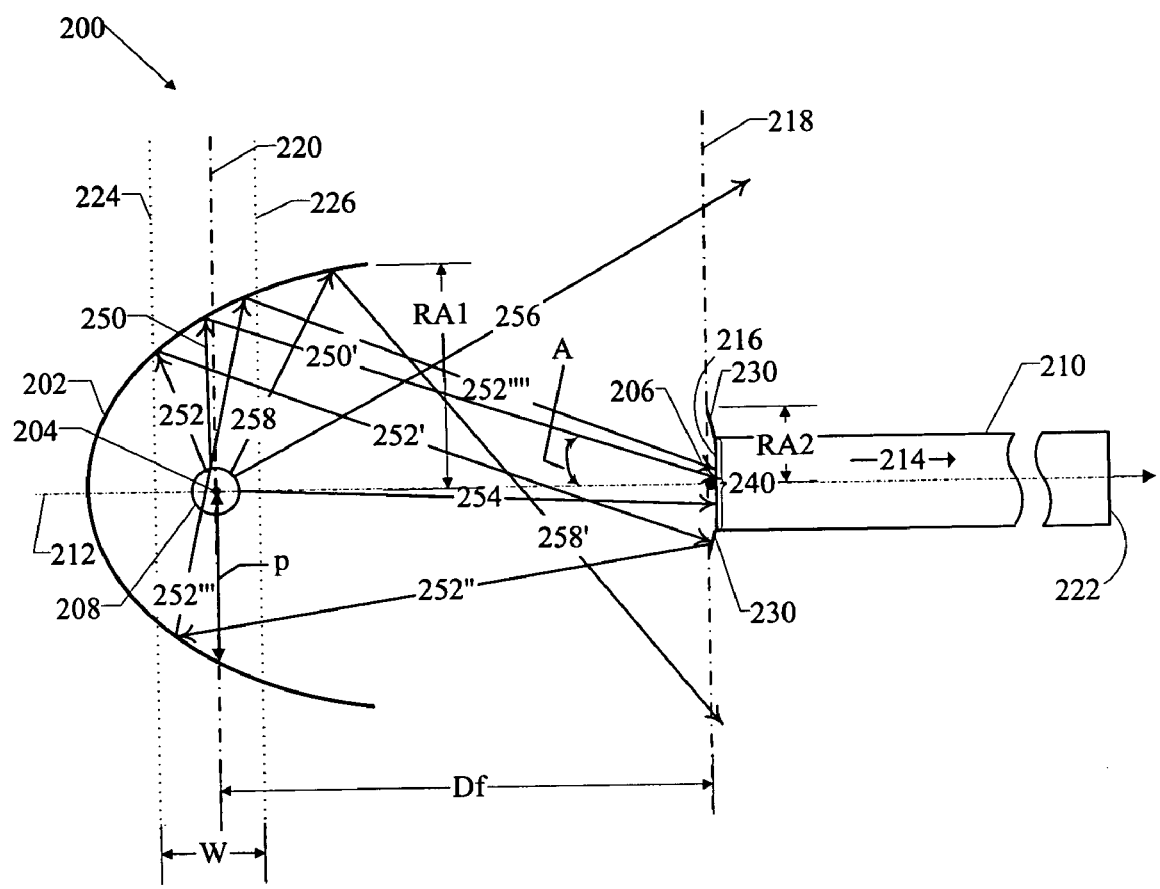
Figure 2
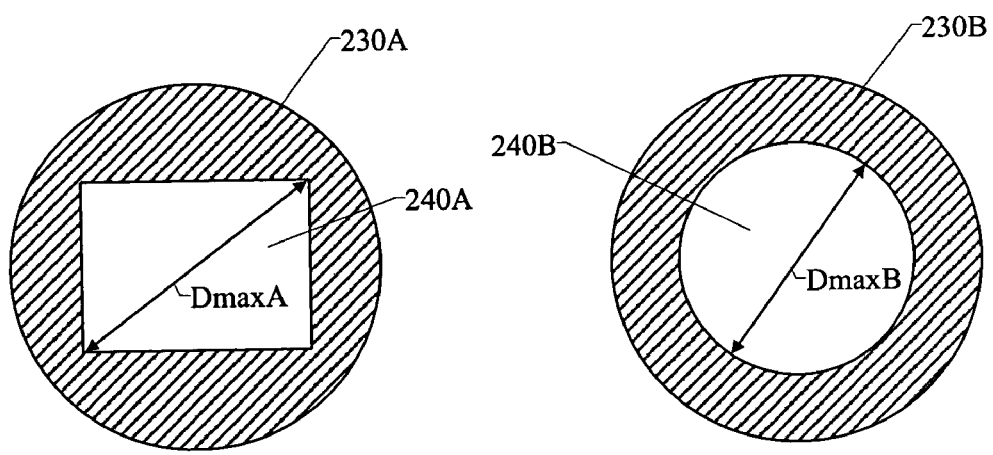
Figure 2A   Figure 2B

LIGHT COLLECTION SYSTEM

BACKGROUND

Projection systems such as digital projectors or rear projection televisions include an image-forming device that projects a desired image. The image-forming device generates the desired image in response to light received from an image signal and a light source received through an illumination relay having a maximum numerical aperture.

The light source used in projection systems is often a multi-directional light source. A portion of the light generated by the multi-directional light source is directed toward the image-forming device and other portions of its generated light are directed in other directions. In some projection systems, an elliptical mirror is used to reflect most of light directed in other directions toward a spatial homogenizer, such as an integration rod, before it is directed to the image-forming device by the illumination relay. Attempts to increase efficiency of collection of the light have previously caused an increase in the maximum numerical aperture (i.e., the sine of angle of acceptance (or incidence)). This increase in the numerical aperture results in a greater angular spread of light exiting the spatial homogenizer. The illumination relay that transfers this light has an upper limit on its angle of acceptance and is unable to deal with the greater angular spread thus making this light having the greater angular spread essentially uncollectible. This uncollectible light may heat up the system and needlessly reduce contrast on the screen. Accordingly, a need exists for a more efficient light collection system.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 2 is an illustration of an illumination apparatus according to an embodiment of the invention;

FIGS. 2A and 2B are front views of second reflectors with rectangular and circular apertures, respectively, according to embodiments of the invention;

DETAILED DESCRIPTION

Figure 1:
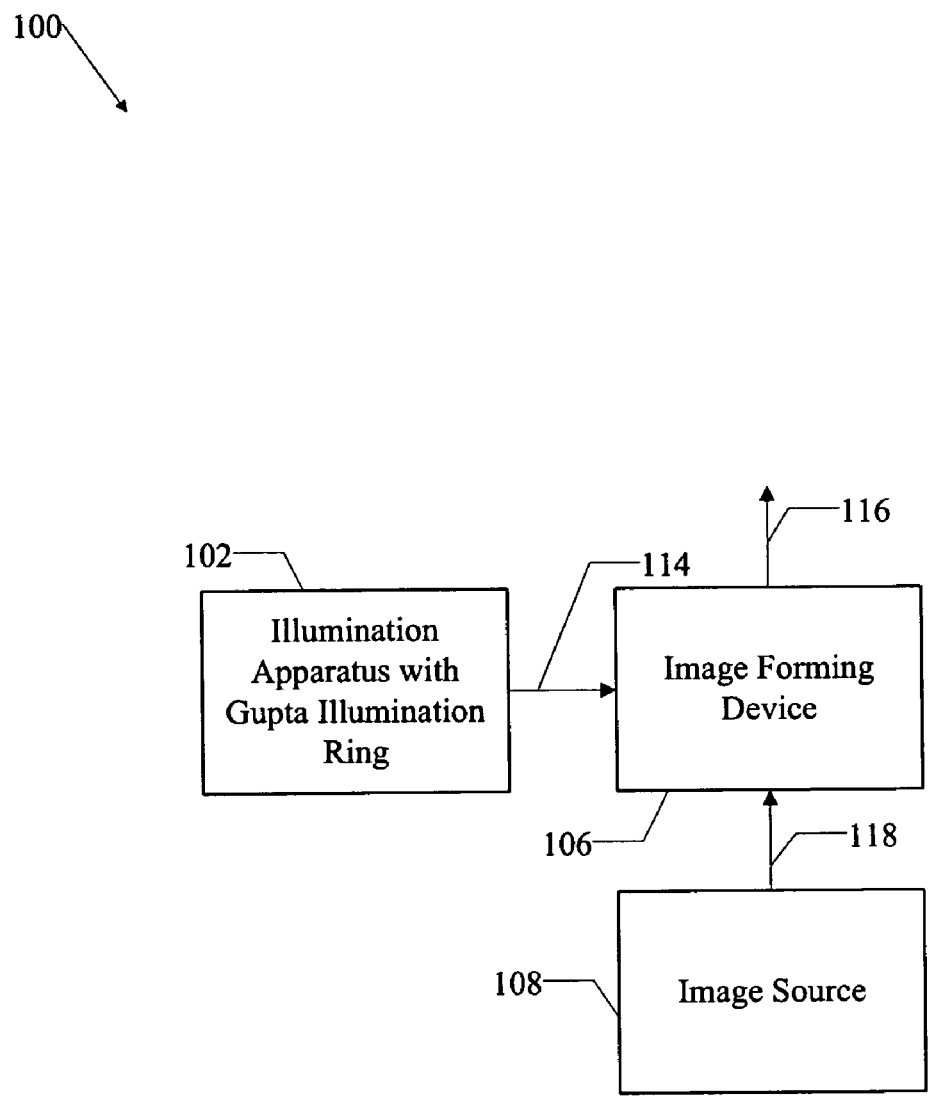
FIG. 1 is a block diagram of a projector according to an embodiment of the invention.

The embodiments of light collection systems presented within increase the light collection efficiency of a light source. In an embodiment of the invention, light directed into a spatial homogenizer such that the light collection efficiency is increased by at least 14%, which is a significant increase in lumens in the fields of photolithography and projectors, particularly digital projectors. Each embodiment achieves higher efficiencies by reflecting light that overfills (does not enter) the entrance of the spatial homogenizer and is collected by a reflector back to a defined region (the 'Gupta illumination ring' defined within) on a substantially elliptical reflector surface. Studies have shown that the light that overfills the entrance to the spatial homogenizer has shallow angles of acceptance. Because of this shallow angle, using embodiments of the invention, this light is reflected back (retroflected) to the elliptical reflector towards its defined region (i.e., the Gupta illumination ring), rather than toward the outer edges of the elliptical reflector surface. The retro-reflected light that reflects off the Gupta illumination ring of the elliptical reflector is itself then re-reflected to another part of the Gupta illumination ring of the elliptical reflector and once again directed to the entrance of the spatial homogenizer while maintaining an angle of acceptance less than the desired maximum angle of acceptance (numerical aperture) necessary for an illumination relay. Such an increased efficiency illumination system is able to not significantly disturb the angular spread of light (its range of exit angles) while still maintaining a substantially uniform spatial ray distribution (a uniform irradiance) with overall increased irradiance across the exit of the spatial homogenizer.

In one embodiment, a light collection system includes a substantially elliptical first reflector and a second reflector with an aperture. The first reflector has a radius of aperture, a first focal point and a second focal point that define an axis, and an annular region (i.e., the Gupta illumination ring) encompassing the first focal point wherein the annular region has a width less than or equal to about ½0 Df where Df is the distance between the first and second focal points. The second reflector has its aperture on the axis. The second reflector is shaped and positioned to reflect electromagnetic radiation from the annular region on the first reflector back to the annular region for reflection to a different portion of the annular region and back to the aperture.

In another embodiment, the invention encompasses a light collection system having a first reflector that has a substantially elliptical surface with a radius of aperture and defines a first focal point and a second focal point, which define an axis. A source of electromagnetic radiation, such as light may be located substantially at the first focal point. A second reflector has a center of retroflection substantially on the axis, an aperture having a maximum opening, formed through the second reflector and substantially centered on the axis, and a radius of aperture less than the radius of aperture of the first reflector and less than the maximum opening of the aperture through the second reflector, wherein the second reflector is positioned to reflect light from a region of the first reflector to the same region of the first reflector.

In another embodiment, the invention encompasses a method for providing an efficient light collection system. A substantially elliptical first reflector is provided, the first reflector having a radius of aperture and defining a first focal point and a second focal point, wherein the first and second focal points define an axis. A source of electromagnetic radiation may be provided and positioned substantially at the first focal point. Also provided is a curved second reflector having an aperture with a diameter or maximum opening formed through the second reflector and is positioned so its aperture is on the axis and its center of curvature is substantially on the axis. The radius of aperture of the second reflector is less than the radius of aperture of the first reflector and less than the diameter or maximum opening of the aperture through the second reflector.

In yet another embodiment, the invention encompasses an apparatus having a substantially elliptical first reflector that defines a first focal point and a second focal point, wherein the first and second focal points define an axis and the first reflector has a numerical aperture NA. A spatial homogenizer has a proximate end positioned substantially at the second focal point and extends away from the first reflector to a distal end. A source of electromagnetic radiation may be located substantially at the first focal point. A curved second reflector has a center of curvature substantially on the axis and an aperture formed through the second reflector and on the axis, wherein the second reflector is positioned to reflect electromagnetic radiation from the first reflector back to the first reflector and has a curvature such that substantially all of the electromagnetic radiation reflected from the second reflector back to the first reflector that enters the spatial homogenizer has a maximum angle of acceptance A substantially such that $\sin(A) \leq NA$.

In yet another embodiment, the invention encompasses a projection system. An illumination apparatus has a substantially elliptical first reflector having a radius of aperture and defining a first focal point and a second focal point, wherein the first and second focal points define an axis; a light source located substantially at the first focal point; and a curved second reflector having a center of curvature substantially on the axis, an aperture having a diameter or maximum opening formed through the second reflector and on the axis, and a radius of aperture less than the radius of aperture of the first reflector and less than about 10 mm, wherein the second reflector is positioned to reflect light from the first reflector back to the first reflector and ultimately back to the aperture in the second reflector. An integrating device has a proximate end positioned substantially at the second focal point and extending away from the first reflector to a distal end. An illumination relay transmits light received from the distal end of the integrating device. An image-forming device has an input for receiving an image signal and an input for receiving the transmitted light from the illumination relay and generates an image in response to the image signal and the transmitted light.

Referring to the drawings, in which like reference numerals indicate like elements, there is shown in FIG. 1 a projector 100 according to an embodiment of the invention. The projector 100 includes an illumination apparatus 102, an image-forming device 106, and an image source 108.

The illumination apparatus 102 transmits light 114 to the image-forming device 106. The image source 108 transmits an image signal 118 to the image-forming device 106. The image-forming device 106 generates an image 116 in response to the transmitted light 114 and the image signal 118. The illumination apparatus 102 includes a reflector that reflects light that overfills the entrance of a spatial homogenizer back to the Gupta illumination ring on an elliptical reflector that may hold the light source.

The image source 108 that generates the image signal 118 may be a computer, a DVD player or a set-top box, for example. The image-forming device 106 may include a digital micro-mirror device (DMD) and a total internal reflection (TIR) prism to generate an image 116 from the image signal 118 and the light 114 received from the illumination apparatus 102, for example. The illumination apparatus 102 according to embodiments of the invention is described below with reference to FIGS. 2–12.

There is shown in FIG. 2 an illumination apparatus 200 according to an embodiment of the invention. The illumination apparatus 200 includes an elliptical first reflector 202 that defines a first focal point 204 and a second focal point 206. The first and second focal points 204, 206 define an axis 212. The elliptical first reflector 202 may be substantially elliptical, as it may be not have a perfect elliptical form. The term "elliptical" as used herein to describe reflectors is used in the general sense of pertaining to the form of an ellipse and encompasses partially elliptical reflectors such as the first reflector 202 that have cross-sections that do not form a complete ellipse. A first focal plane 220 extends through the first focal point 204 and is substantially orthogonal to the axis 212. A second focal plane 218 extends through the second focal point 206 and is substantially orthogonal to the axis 212.

The distance between the first focal point 204 and the reflector surface in a direction perpendicular to the axis 212 is known as the semi-latus rectum 'p'. A partial portion of the elliptical mirror surface characterized as a region rotated about the first focal point 204 on the axis 212 and having a width W is defined herein as the "Gupta illumination ring." The Gupta illumination ring is an annular region of the first reflector 202 that encompasses the first focal point. As shown in FIG. 2, the width W of the Gupta illumination ring is the axially projected width of the Gupta illumination ring. That is, the axial width W is the distance along the axis 212 of the projection of the Gupta illumination ring onto the axis 212 when projected in a direction substantially perpendicular to the axis 212. In an embodiment of the invention, the Gupta illumination ring is the region between two planes 224, 226 that straddle and are substantially parallel to the first focal plane 220. In an embodiment of the invention, the first focal plane 220 is substantially centered between the two planes 224, 226. The width W of the Gupta illumination ring is defined herein as, in a preferred embodiment, as being less than or equal to about $1/20^{th}$ of the distance Df between the first focal point 204 and the second focal point 206.

A light source 208 is located at the first focal point 204. The light source 208 is substantially located at the first focal point 204, as it may not be exactly positioned at the first focal point 204 and/or may encompass regions in the vicinity of or a volume around the first focal point 204. The light source 208 may be permanent or optionally replaceable. A spatial homogenizer, such as an integrating device 210 (e.g., a solid or hollow glass rod or hollow metal reflecting tube) has a proximate end 216 (entrance) positioned at or in proximity to (slightly in front of or slightly behind) the second focal point 206 and extends away from the first reflector 202 to its distal end 222 (its exit). In some exemplary embodiments, the proximate end 216 of the integrating device 210 has a surface area between about 10 mm$^2$ and 60 mm$^2$.

The light source 208 is a multi-directional light source. Some light rays 254 from the light source 208 are directed from the light source 208 directly, without reflection, to the proximate end 216 of the integrating device 210. Light rays that are directed to the proximate end 216 of the integrating device 210 are transmitted by the integrating device 210 in the direction of arrow 214 and out its distal end 222 toward an image-forming device 106, for example. Other light rays 256 from the light source 208 are directed from the light source 208 away from the elliptical first reflector 202 and miss the proximate end 216 of the integrating device 210.

Light rays 250 from the light source 208 that are directed toward the elliptical first reflector 202 are generally reflected by the first reflector 202 toward the second focal point 206 and, therefore, toward the proximate end 216 of the integrating device 210. However, some light rays 252 from the light source 208 that are directed to the elliptical first reflector 202 may miss the proximate end 216 of the integrating device 210 and thus "overfill" the entrance of the integrating device 210.

Accordingly, some of the reflected light rays 252' that miss the proximate end 216 of the integrating device 210 may be directed to an "overfill" region. The overfill region is a region proximate to, but outside of, the proximate end 216 of the integrating device 210. The light rays 252' directed to the overfill region are reflected by a second reflector 230, a curved or retroflecting surface, back to the 'Gupta illumination ring' of the elliptical first reflector 202. These light rays 252" are then reflected again by the elliptical first reflector 202 to another portion of the 'Gupta illumination ring' before being directed toward the proximate end 216 of the integrating device 210 as illustrated by light rays designated 252''' and 252''''. An aperture 240 is formed through the second reflector 230 and on the axis 212 to allow the light rays from the first reflector 202 to pass through the aperture 240 and to the proximate end 216 of the integrating device 210. Some of the light rays 258 reflected by the first reflector 202 may be reflected as light rays 258' that miss the proximate end 216 of the integrating device 210 and are outside the overfill region and thus miss the second reflector 230.

The shape and size of the aperture 240 through the second reflector 230 may be selected based on the shape and/or size of the proximate end 216 of the spatial homogenizer 210. In an embodiment of the invention as shown in FIG. 2A, the aperture 240A through the second reflector 230A is substantially rectangular. In an embodiment of the invention as shown in FIG. 2B, the aperture 240B through the second reflector 230B is substantially circular. In an embodiment of the invention, the aperture 240 has substantially the same shape, and not necessarily the same size, as the shape of the proximate end 216 of the integrating rod 210. In an embodiment of the invention, the integrating device 210 has a lateral cross-section to match the aspect of the image-forming device. The aperture 240 has a maximum opening that depends upon the size and shape of the aperture 240. The maximum opening or dimension of the opening of the aperture 240A shown in FIG. 2A is the diagonal DmaxA of the rectangle. The maximum opening or dimension of the substantially circular opening of the aperture 240B shown in FIG. 2B is the diameter DmaxB of the circle.

In an exemplary embodiment, the projector 100 includes a first reflector 202 having a radius of curvature about 19 mm, a conic constant of about −0.6, an aperture radius of about 30 mm, a central hole aperture radius of 3.5 mm, a first focal point 204 located about 10 mm from the vertex of the first reflector 202, and a second focal point 206 located about 78 mm from the first focal point 204. As used herein, the radius of curvature of a non-spherical surface is the base radius of curvature at a point at the base of the surface such as at the point where the axis 212 intersects the first reflector 202 in FIG. 2. The light source is a 1 mm fireball, 200 W DC mercury arc lamp light source 208. A second reflector is positioned substantially at the second focal point 206 and has a radius of curvature between about 50 mm and about 65 mm to direct light to the "Gupta illumination ring" of the first reflector 202. Since the distance between the focal points is about 78 mm, the Gupta illumination ring has a width W less than or equal to about 4 mm centered around a rotation of the semi-latus rectum at the first focal point 204. The spatial homogenizer is a rectangular 5 mm by 4 mm integrating device 210. The image-forming device 106 is a 14 mm by 10 mm DMD with a numerical aperture (NA) of 0.2. An illumination relay having an NA of about 0.2 couples light exiting the distal end 222 of the integrating device 210 to the image-forming device 106.

Figure 3:
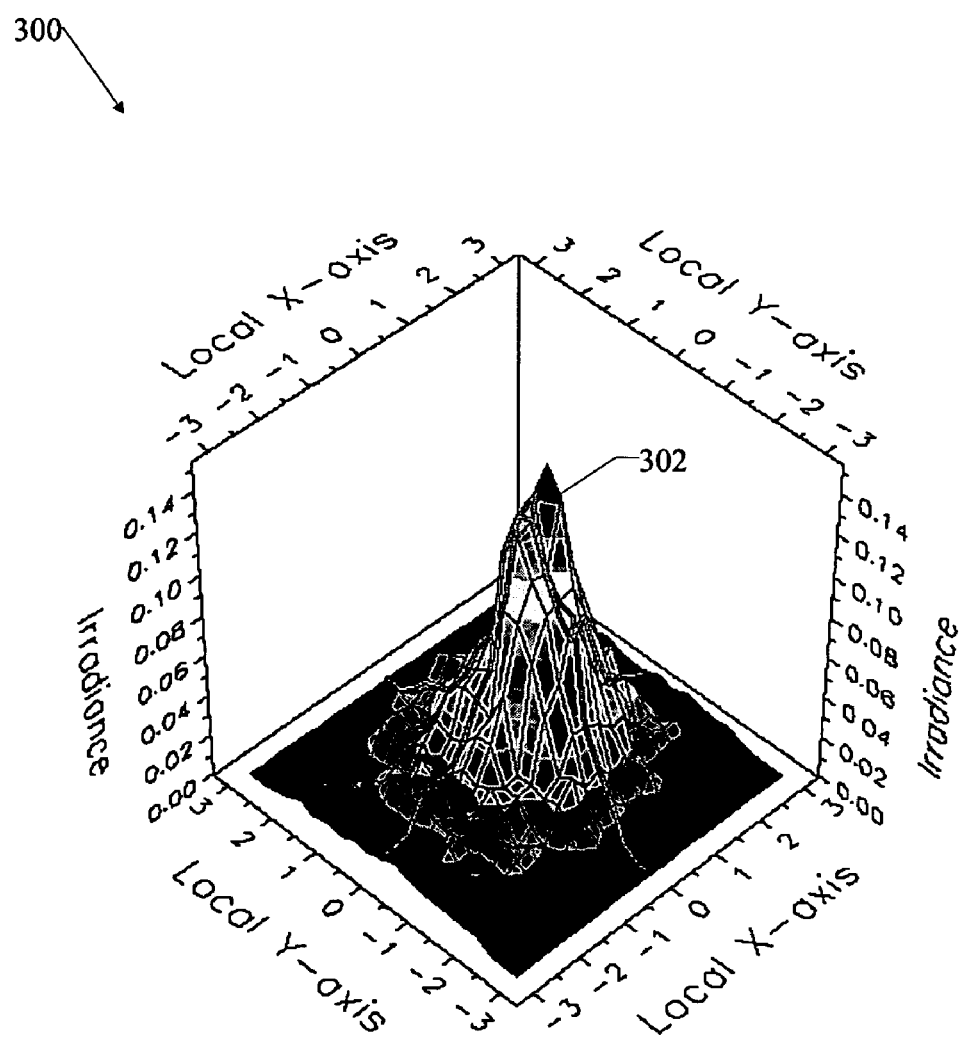
FIG. 3 is a plot of irradiance at the second focal plane of an illumination apparatus according to an embodiment of the invention.

An exemplary diagram 300 shown in FIG. 3 illustrates the distribution of and irradiance of light at the second focal plane 218 for an illumination system shown in FIG. 2 when the second reflector 230 is not present. The "Local X-axis" in the diagram 300, scaled in mm, corresponds to an axis parallel to the dotted line 218 shown in FIG. 2 that intersects the second focal point 206. The "Local Y-axis" shown in the diagram 300, scaled in mm, corresponds to an axis (not shown) perpendicular to the dotted line 218 that intersects the second focal point 206. The irradiance of the light reflected by the first reflector 202 upon the second focal plane 218 is illustrated by the graph 302 (scaled in Watts/m$^2$). The graph 302 shows that most of the light from the elliptical reflector is directed to the second focal point or to a region in proximity to the second focal point. In other words, the irradiance decreases as you move further away from the second focal point 206 in the second focal plane 218.

Figure 4:
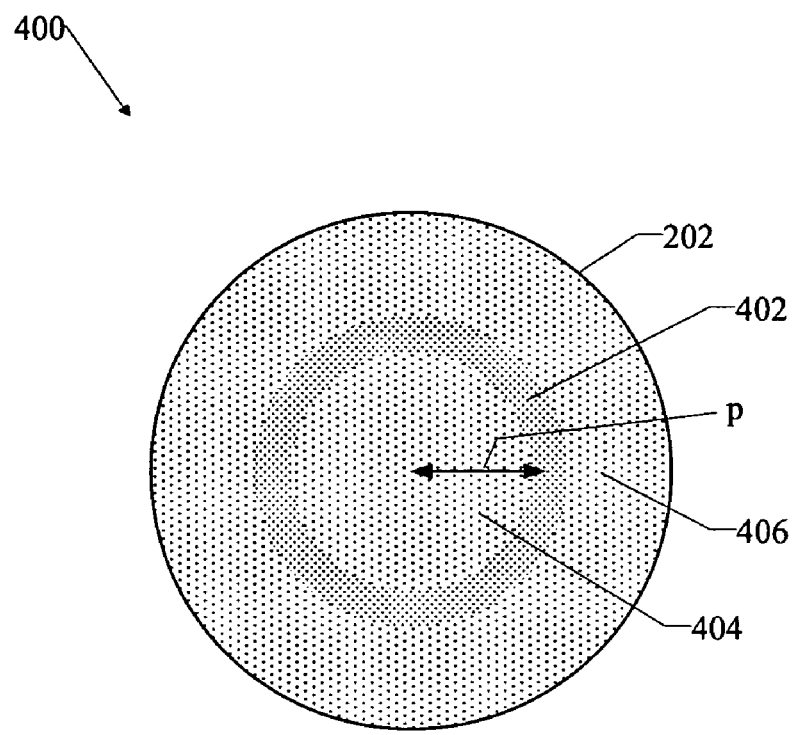
FIG. 4 is an illustration of the distribution of light on an elliptical reflector according to an embodiment of the invention.

Analysis by simulation shows that most of the light directed to a region in proximity to the second focal point and outside the proximate end 216 of the integrating device 210 (i.e., the "overfill" region) is received from a first portion of the first reflector 202 that straddles, but is not necessarily centered on, the first focal plane 220, defined within as the "Gupta illumination ring". The distribution of light on the surface of an unfolded or flattened elliptical first reflector 202 is illustrated in the diagram 400 shown in FIG. 4. The density of the dots in FIG. 4 illustrate the density of light rays reflected by the first reflector 202 including rays received from the second reflector 230. The density of light rays reflected from the first portion 402 (the "Gupta illumination ring") of the first reflector 202 is greater than the density of light rays reflected from a second portion 404 or a third portion 406 of the first reflector 202. Although illustrated as such in FIG. 4, the density of reflected light rays does not necessarily abruptly change from one portion 402, 404, 406 of the first reflector 202 to another. The diagram 400 in FIG. 4 is for illustrative purposes only and the actual density of light rays generally more gradually transitions from portion to portion.

The increased density in the first portion 402 relative to the second and third portions 404, 406 results from light generated from the bulb distribution and light reflected from the second reflector 230 back onto the first reflector 202 Gupta illumination ring region 402. The light reflected by the second reflector 230 (i.e., in the overfill region) substantially originates from the first portion 402 (i.e., the Gupta illumination ring) of the first reflector 202 and is substantially reflected back to the first portion 402 of the first reflector 202. The light rays from the first reflector 202 that are directed to the overfill region substantially have shallow angles with respect to the axis 212 due to the numerical aperture of the first portion 402 of the first reflector 202 being lower than the numerical aperture of the first reflector 202.

The first portion 402 of the elliptical first reflector 202, straddling the first focal plane 220, is illustrated in the illumination apparatus 200 of FIG. 2 as being the portion bounded by dashed lines 224, 226, i.e., the Gupta illumination ring. Most of the light rays in the overfill region are originally reflected by the first portion 402 of the first reflector 202. Because of this fact, the dimensions (e.g., radius of curvature, radius of aperture, . . . ) and position of the second reflector 230 are selected to retroflect light rays from the first portion 402 of the elliptical first reflector 202 that are incident upon the overfill region back to the first portion 402 of the elliptical first reflector 202. These retroflected light rays are again reflected to another region in the first portion 402 for further reflection to the proximate end 216 to enter the integrating device 210. In other words, most of the light directed from the first reflector 202 to the overfill region is originally reflected from the first portion 402 of the first reflector 202 and the second reflector 230 is accordingly designed to retroflect light received from the first portion 402 of the first reflector 202 back to the first portion 402. In an embodiment of the invention, the second reflector 230 is selected to reflect light received from a first portion 402 of the first reflector 202 that has an axially projected width W (see FIG. 2) back to the first portion 402. This axially projected width W in a preferred embodiment of the invention is less than or equal to about one-twentieth (1/20) of the distance Df between the first and second focal points 204, 206. The light retroflected back to the first portion 402 is at a slightly different angle of incidence and thus ultimately is reflected back to the integrating device 210 proximate end 216 at a slightly different angle of acceptance than the first attempt and thus manages to enter the integrating device 210, thereby providing the increased efficiency while still maintaining a low angle of acceptance.

In embodiments of the invention, the dimensions and position of the second reflector 230 are selected so the angular spread of light incident upon exit from the distal end 222 of the integrating device 210 is substantially the same with as it is without the second reflector 230. This is achieved by reflecting light received in the overfill region back to the Gupta illumination ring, the first portion 402 of the first reflector 202. The second reflector size (it radius of aperture RA2 in FIG. 2) is further limited to avoid capturing light from the first reflector 202 that has a higher angle of acceptance and reflecting it back to the first reflector 202 into a region outside of the first portion 402 and possibly having it reflected back into the integrating device 210. By limiting the region of retroflection, the angle of acceptance is controlled thereby maintaining the numerical aperture of light from the first reflector downstream to the imaging device. In an embodiment of the invention, the aperture of the second reflector 230 is positioned at about the second focal point 206 and the second reflector 230 has a surface area about three times the surface area of the proximate end 216 of the integrating device 210. In an embodiment of the invention, the first reflector 202 has a numerical aperture NA and the second reflector 230 has a retroreflective surface and size such that substantially all of the light reflected from the second reflector 230 back to the first reflector 202 that enters the integrating device 210 has a maximum angle of acceptance A substantially such that $\sin(A) \leq NA$. In an embodiment of the invention, the numerical aperture NA is less than or equal to about 0.6 ($NA \leq 0.6$).

Figure 5A:
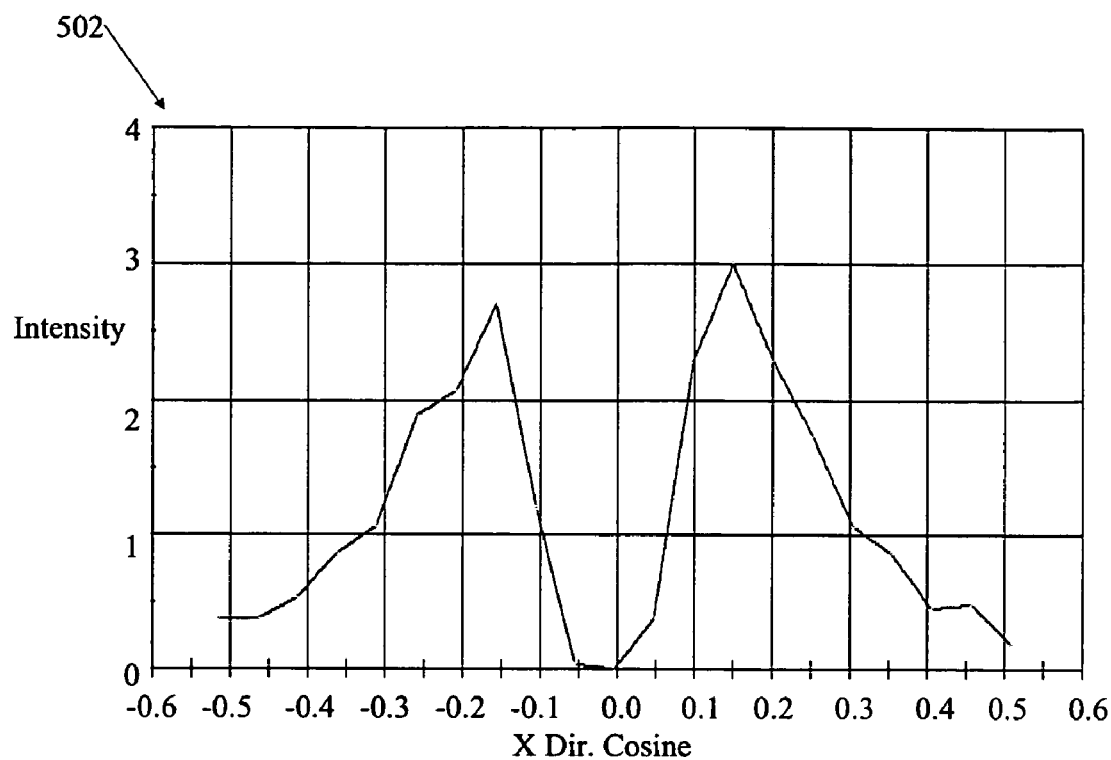
FIG. 5A is a plot of the angular spread of light at the exit of an integrating device of an illumination apparatus without a second reflector according to an embodiment of the invention.
Figure 5B:
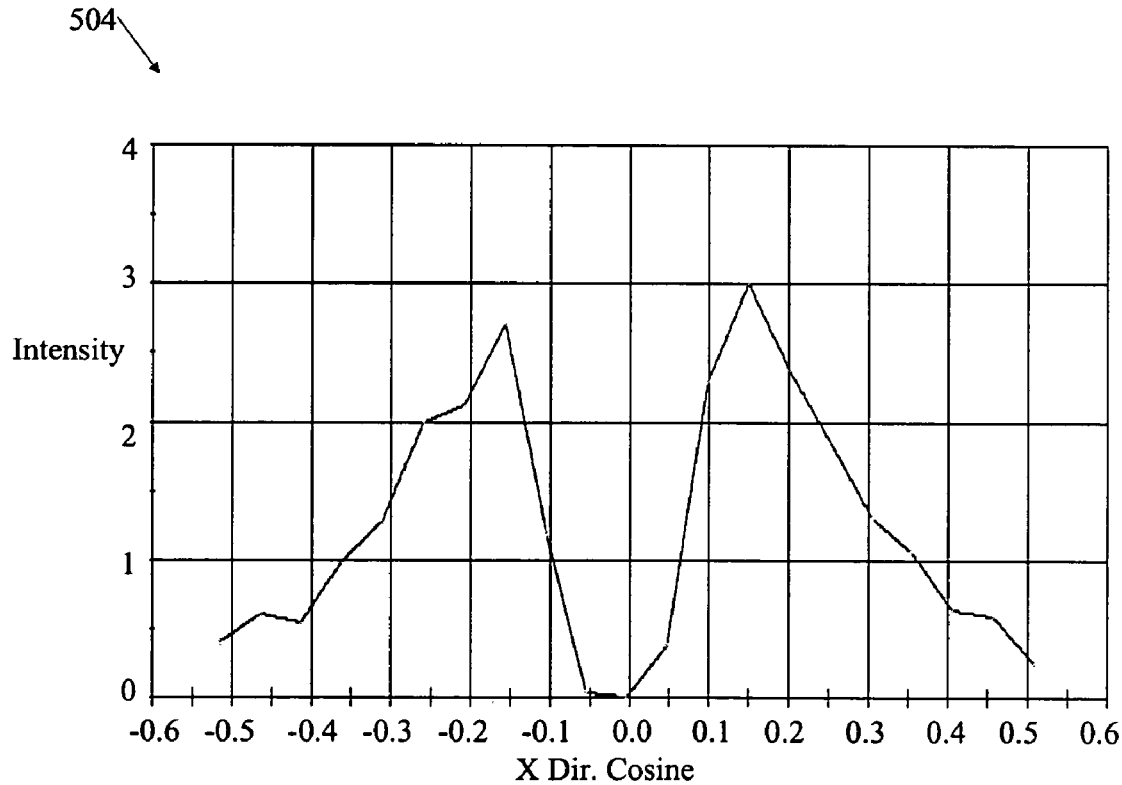
FIG. 5B is a plot of the angular spread of light at the exit of an integrating device of an illumination apparatus with a second reflector according to an embodiment of the invention.
Figure 6:
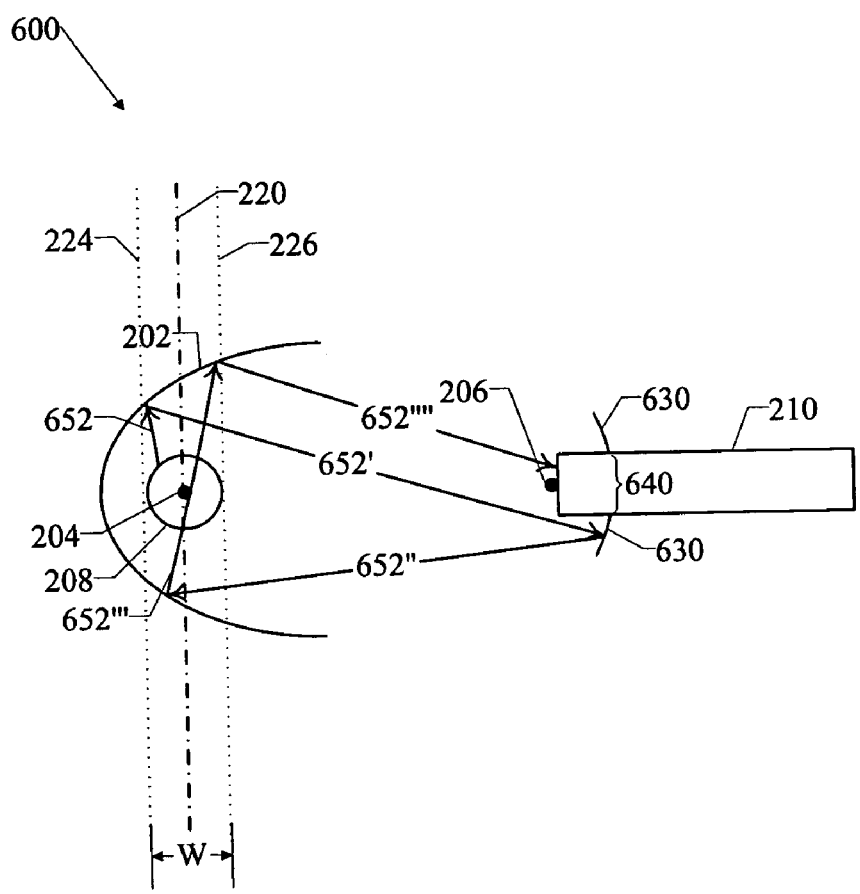
FIG. 6 is an illustration of an illumination apparatus having a second reflector behind the second focal point according to an embodiment of the invention.

FIGS. 5A and 5B are intensity vs. direction cosine plots from the exit of the spatial homogenizer, the integrating device 210 according to an embodiment of the invention. The drop in intensity in the centers indicates that there is no or little light radiated in that direction, such as on-axis. This drop results from the shadow of the light source 208, such as may be caused by a bulb and electrodes of the light source 208, that is positioned substantially at the first focal point 204. However, the irradiance, which is the spatial ray distribution, is substantially uniform across the entire exit. The uniformity in irradiance is achieved by the multiple bounces inside the integrating device 210. However, the multiple bounces do not significantly vary the angular distribution which depends upon the cross sectional shape of the integrating device 210. That is, there is uniform light irradiance but the angles at which the light emerges from the integrating device vary. FIG. 5A shows a plot 502 of the angular spread of light exiting the distal end 222 of the integrating device 210 of the illumination apparatus 200 described above but without a second reflector installed, i.e., a less-efficient light collection system. FIG. 5B shows a similar plot 504 of the angular spread of light exiting the distal end 222 of the integrating device 210 for the illumination apparatus 200 including the second reflector 230 that reflects light back to the Gupta illumination ring. As illustrated by FIGS. 5A and 5B, the angular spread of light is similar for an illumination apparatus having a second reflector 230 according to an embodiment of the invention as it is for an illumination system without the second reflector 230.

In an embodiment of the invention, the second reflector 230 has a radius of aperture RA2 (shown in FIG. 2) that is less than the radius of aperture of the first reflector RA1 (shown in FIG. 2) and also less than the maximum dimension (e.g., DmaxA, DmaxB) of the opening of the aperture 240 through the curved second reflector 230. In an embodiment of the invention, the second reflector 230 has a radius of aperture RA2 less than about 10 mm. In an embodiment of the invention, the second reflector 230 is curved and has a center of curvature substantially on the axis 212 and has a radius of aperture RA2 less than about 10 mm. In an embodiment of the invention, the radius of aperture RA2 of the second reflector 230 is between about 3 mm and about 8 mm. In the embodiment illustrated in FIG. 2, the second reflector 230 generally has a spherical curvature.

In an embodiment of the invention, the second reflector 230 has radius of curvature RC between about 0.5 Df and about 1.5 Df, where Df is the distance along the axis 212 between the first and second focal points 204, 206. In another embodiment, the second reflector 230 has radius of curvature RC between about 0.7 Df and about 0.8 Df. In yet another embodiment, the second reflector 230 has radius of curvature RC between about 0.5 Df and about 0.9 Df. In an embodiment of the invention, the elliptical first reflector 202 has a conic constant between about −0.5 to about −0.7 and has a radius of aperture RA1 between about 14 mm and about 26 mm.

The curvature of the second reflector is selected to correspond to the curvature and conic constant of the first reflector 202. In an embodiment of the invention, the first reflector 202 has a conic constant of about −0.6 and the second reflector 230 has radius of curvature RC of about 0.8 Df.

In an embodiment of the invention, the radius of curvature RC of the second reflector 230 equals about 60 mm and Df equals about 78 mm. In another embodiment of the invention, the radius of curvature RC of the second reflector 230 is greater than about 50 mm. In yet another embodiment of the invention, the radius of curvature RC of the second reflector 230 is between about 45 mm and about 60 mm.

Light rays that enter the proximate end 216 of the integrating device 210 at a shallow angle with respect to the axis 212 also exit from the distal end 222 at a shallow angle. Similarly, light rays that enter the proximate end 216 of the integrating device 210 at a steep angle also exit from the distal end 222 at a steep angle. In an embodiment of the invention, the integrating device 210 is a rectangular apertured solid (e.g., glass or quartz) or hollow rod with highly reflective inner sides in the wavelength region of interest. The width of the integrating device 210 ranges from about 6 mm to about 10 mm and has a length of about 25 mm in an embodiment of the invention.

Light exiting the distal end 222 of the integrating device 210 may be captured by an illumination relay device which images it on an optical modulator (i.e., an image-forming device). For a system with an optical modulator having a numerical aperture NA, a first reflector 202, light source 208, and integrating device 210, the dimensions (e.g., radius of curvature and radius of aperture) and position of the second reflector 230 are selected so the numerical aperture NA of the system with the second reflector 230 is generally not greater than the NA of the system without the second reflector 230 (see FIGS. 5A and 5B). Otherwise, the light in the overfill region reflected by the second reflector 230 may not be captured by the illumination relay device when it exits the distal end 222 of the integrating device 210.

In the embodiment of the invention illustrated in FIG. 2, the area of the aperture 240 of the second reflector 230 is substantially the same size as the area of the proximate end 216 of the integrating device 210 and the second reflector 230 is positioned so its aperture 240 is substantially at the second focal point 206. In another embodiment of the invention shown in FIG. 6, the illumination apparatus 600 includes a second reflector 630 that is positioned so its aperture 640 is located further away from the first reflector 202 than the second focal point 206. The radius of curvature and radius of aperture of the second reflector 630 will vary depending on the position of the second reflector 630 with respect to the second focal point 206. However, light reflected from the second reflector 630 is still designed to be re-reflected back to the Gupta illumination region of the first reflector 202. Some of the reflected light rays 652 are reflected by the first reflector 202 as light rays 652' that miss the proximate end of the integrating device 210 and are directed to the "overfill" region. These light rays 652' are reflected by the second reflector 630, a curved or retroflecting surface, back to the 'Gupta illumination ring' of the first reflector 202. These light rays 652" are then reflected again by the elliptical first reflector 202 to another portion of the 'Gupta illumination ring' before being directed toward the proximate end of the integrating device 210 as illustrated by light rays designated 652''' and 652''''.

Figure 7:
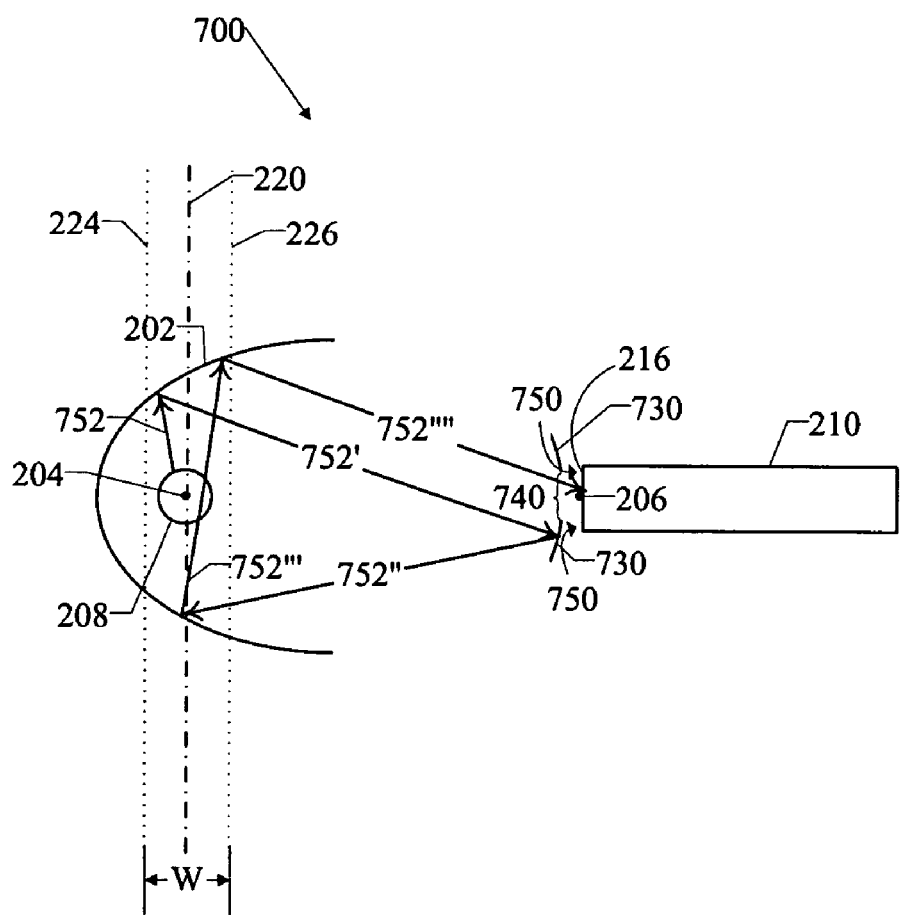
FIG. 7 is an illustration of an illumination apparatus having a second reflector between the first and second focal points according to an embodiment of the invention.

In another embodiment of the invention as shown in FIG. 7, the illuminating apparatus 700 includes a second reflector 730 that is positioned so its aperture 740 is between the proximate end 216 of the integrating device 210 and the first reflector 202. Further, the aperture 740 has an opening having an area that is larger than the area of the entry of proximate end 216 of the integrating device such that the second reflector substantially blocks light directed toward the outer edge 750 of the proximate end 216 of the integrating device 210. The radius of curvature of the second reflector 730 will vary depending on the position of the second reflector 730 with respect to the second focal point 206. However, light reflected from the second reflector 330 is still designed to be re-reflected back to the Gupta illumination region of the first reflector 202. Some of the reflected light rays 752 are reflected by the first reflector 202 as light rays 752' that miss the proximate end of the integrating device 210 and are directed to the "overfill" region. These light rays 752' are reflected by the second reflector 730, a curved or retroflecting surface, back to the 'Gupta illumination ring' of the first reflector 202. These light rays 752" are then reflected again by the elliptical first reflector 202 to another portion of the 'Gupta illumination ring' before being directed toward the proximate end of the integrating device 210 as illustrated by light rays designated 752''' and 752''''.

Figure 8:
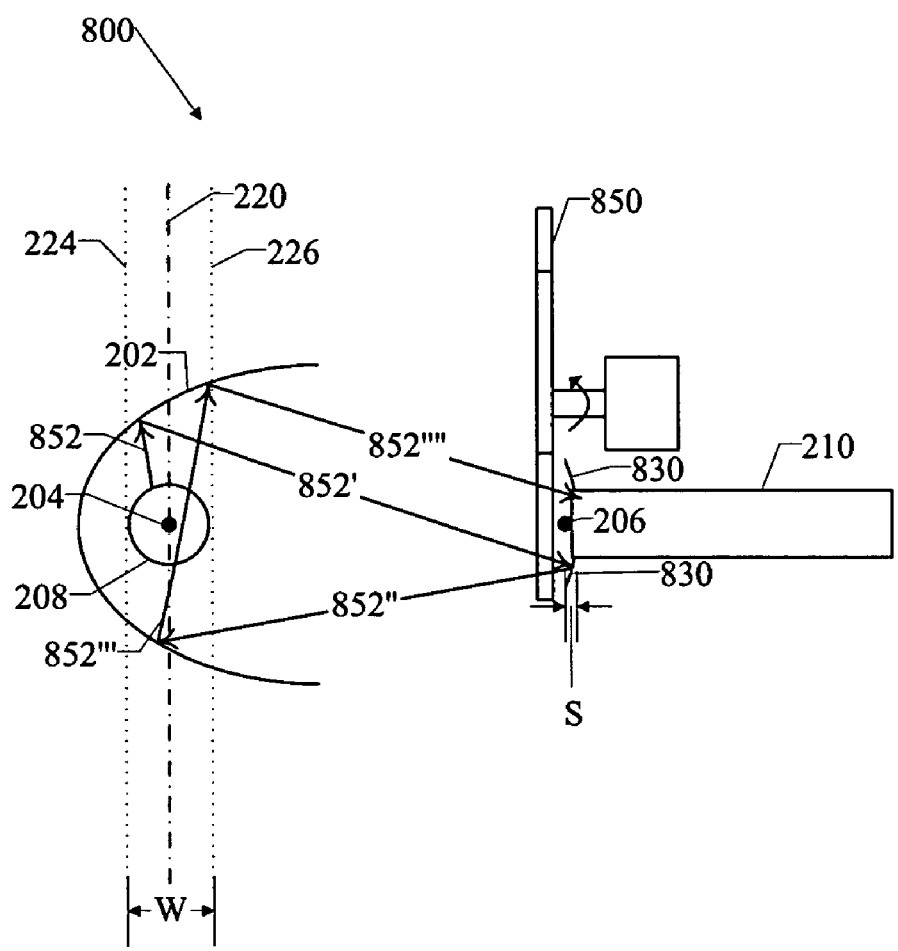
FIG. 8 is an illustration of an illumination apparatus having a color wheel between the first and second focal points according to an embodiment of the invention.

In an embodiment of the invention, the illumination apparatus 800 shown in FIG. 8 includes a curved second reflector 830 having a sag S that is less than about 1 mm. The sag S of the second reflector allows for the positioning of other devices between the first and second reflectors 202, 830. For example, in the embodiment illustrated in FIG. 8, the illumination apparatus 800 includes a color wheel 850 positioned between the first and second reflectors 202, 830. For example, with a light source 208 that is a white light source, the white light generated by the light source 208 or lamp passes through the color wheel filter 850, causing red, green and blue light to be transmitted in sequence into the integrating device 210. A color image may then be formed by the image-forming device 106 in response to the transmitted light. However, light reflected from the second reflector 830 is still designed to be re-reflected back to the Gupta illumination region of the first reflector 202 through the color wheel 850. Some of the reflected light rays 852 are reflected by the first reflector 202 as light rays 852' that miss the proximate end of the integrating device 210 and are directed to the "overfill" region. These light rays 852' are reflected by the second reflector 830, a curved or retroflecting surface, back to the 'Gupta illumination ring' of the first reflector 202. These light rays 852" are then reflected again by the elliptical first reflector 202 to another portion of the 'Gupta illumination ring' before being directed toward the proximate end of the integrating device 210 and through the color wheel 850 as illustrated by light rays designated 852''' and 852''''.

Figure 9:
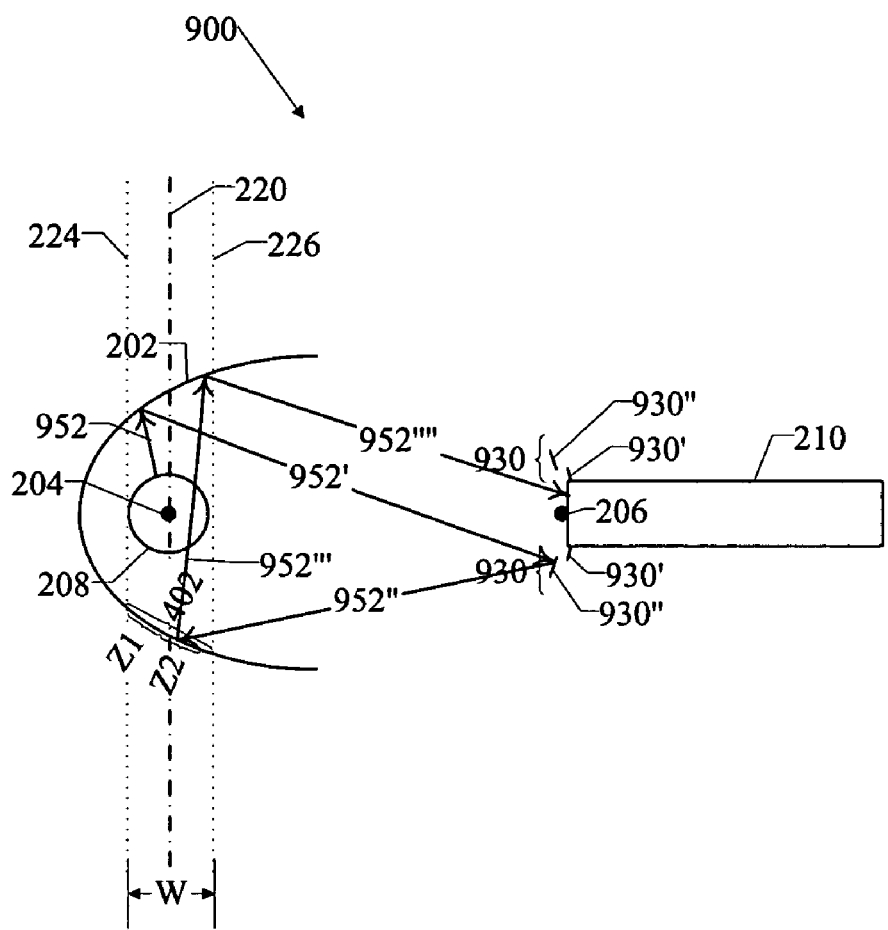
FIG. 9 is an illustration of an illumination apparatus having a segmented second reflector according to an embodiment of the invention.

In the embodiment of the invention shown in FIG. 2, the second reflector 230 has a continuous surface (outside of the aperture opening). The illumination apparatus 900 according to an embodiment of the invention shown in FIG. 9 includes a second reflector 930 that is segmented. The second reflector 930 includes a first segment 930' and a second segment 930". Each segment of the second reflector 930 is selected to reflect light received from a zone of the elliptical reflector 202 where each zone is a slice of the middle portion 402 of the first reflector 202. For example, the first segment 930' is selected to reflect light received from the first zone Z1 back to the Gupta illumination ring. In addition, the second segment 930" is selected to reflect light received from the second zone Z2 back to the Gupta illumination ring as illustrated by exemplary rays 952 in FIG. 9. Some of the reflected light rays 952 are reflected by the first reflector 202 as light rays 952' that miss the proximate end of the integrating device 210 and are directed to the "overfill" region. These light rays 952' are reflected by the second segment 930" of the second reflector 930 back to the second zone Z2 of the 'Gupta illumination ring' of the first reflector 202. These light rays 952" are then reflected again by the elliptical first reflector 202 to another portion of the 'Gupta illumination ring' before being directed toward the proximate end of the integrating device 210 as illustrated by light rays designated 952''' and 952''''. Although the second reflector 930 is illustrated in FIG. 9 as having two segments, embodiments of the invention may include a second reflector 930 having more than two segments. In fact, the facets may be replaced by micro retroreflectors such as a plurality of prisms or corner cubes to create a large number of segments within the Gupta illumination ring.

Figure 10:
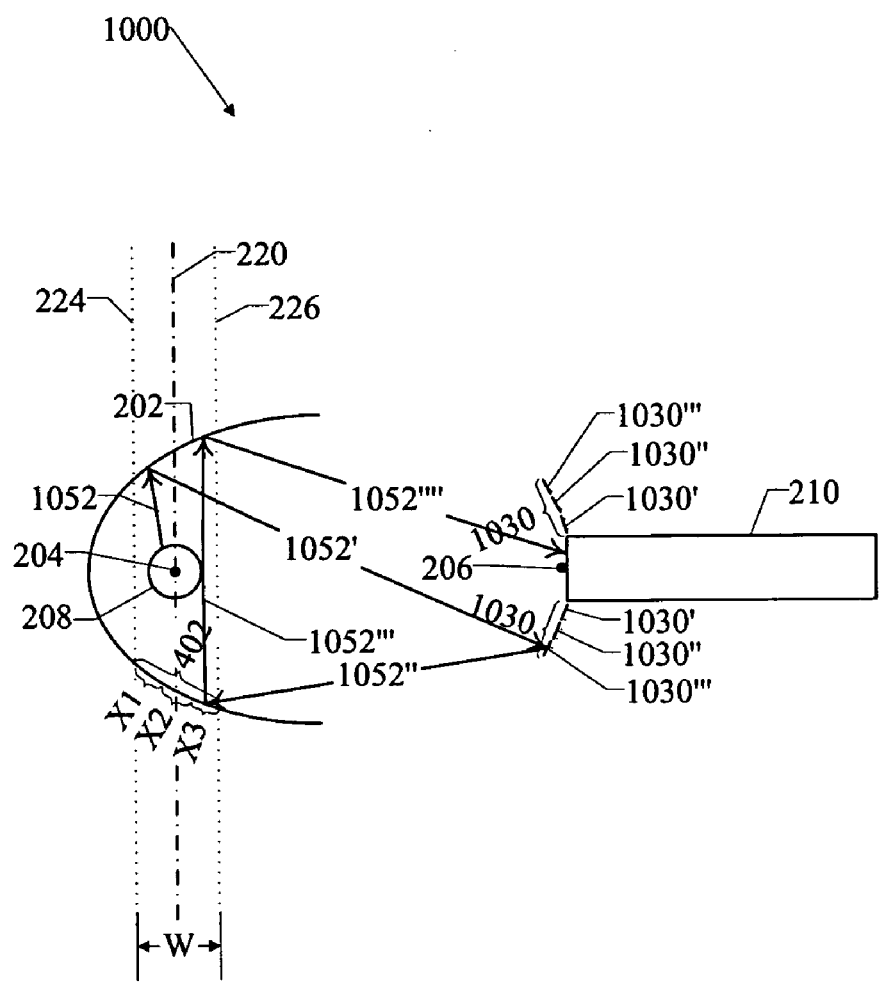
FIG. 10 is an illustration of an illumination apparatus having a faceted second reflector according to an embodiment of the invention.

There is shown in FIG. 10 an embodiment of the invention that includes a faceted second reflector 1030. Each facet 1030', 1030", 1030''' is selected to reflect light received from a zone of the Gupta illumination ring of the elliptical reflector 202 where each zone is a slice of the middle portion 402 of the first reflector 202. For example, the first facet 1030' is selected to reflect light received from the first zone X1, the second facet 1030" is selected to reflect light received from the second zone X2, and the third facet 1030''' is selected to reflect light received from the third zone X3 as illustrated by exemplary rays 1052 in FIG. 10. Some of the reflected light rays 1052 are reflected by the first reflector 202 as light rays 1052' that miss the proximate end of the integrating device 210 and are directed to the "overfill" region. These light rays 1052' are reflected by the third facet 1030''' of the second reflector 1030 back to the third zone X3 of the 'Gupta illumination ring' of the first reflector 202. These light rays 1052" are then reflected again by the elliptical first reflector 202 to another portion of the 'Gupta illumination ring' before being directed toward the proximate end of the integrating device 210 as illustrated by light rays designated 1052''' and 1052''''. Although the second reflector 1030 is illustrated in FIG. 10 as having three facets, embodiments of the invention may include a second reflector 1030 having more than three facets. Embodiments of the invention encompass a second reflector having facets that are flat, spherical or non-spherical.

Figure 11:
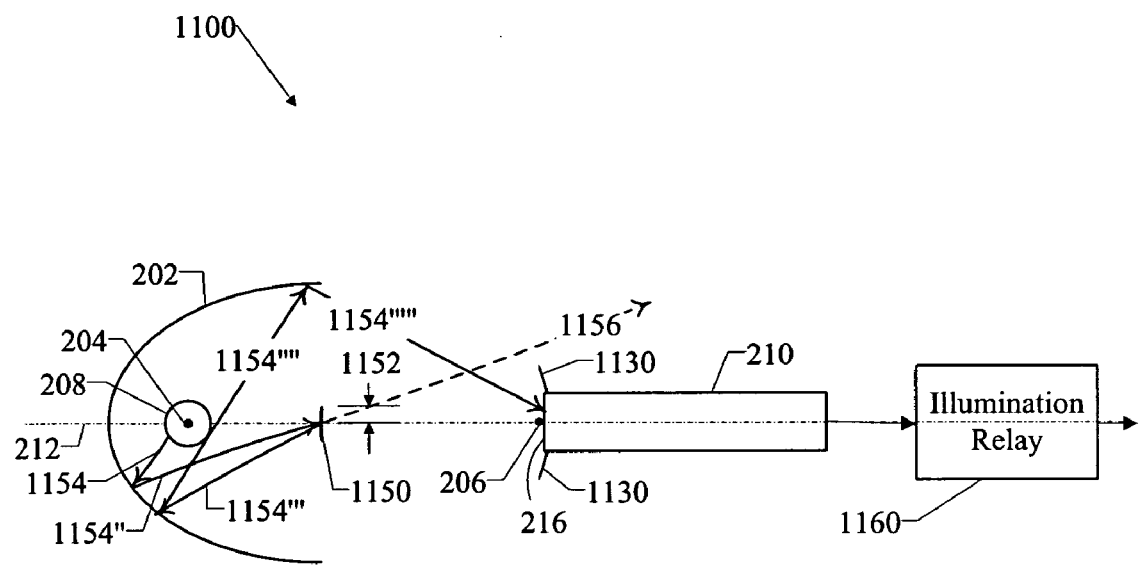
FIG. 11 is an illustration of an illumination apparatus having a supplemental reflector according to an embodiment of the invention.

FIG. 11 illustrates an apparatus 1100 having a supplemental reflector 1150 according to an embodiment of the invention. The supplemental reflector 1150 is positioned along the axis 212 and curved in the same direction as the first reflector 202. The supplemental reflector 1150 is positioned and has a radius of aperture 1152 so it is substantially in the shadow of the light source 208 so it does not substantially obstruct the path of light from the first reflector 202. The shadow may be caused by metal electrodes of a lamp bulb, for example. The supplemental reflector 1150 intercepts light rays that are leaving the first reflector 202 at such high angles that the rays would otherwise be outside the overfill region. The supplemental reflector 1150 re-directs these rays so they are reflected to the proximate end 216 of the integrating device 210. Embodiments of the invention encompass a supplemental reflector that is spherical, elliptical, hyperbolic, parabolic, faceted, aspherical or conical. Embodiments of the invention encompass a supplemental reflector that includes a plurality of prisms or corner cubes for reflecting light to the first reflector 202.

The function of the supplemental reflector 1150 is illustrated by the light rays 1154 shown in FIG. 11. Some light rays 1154' from the light source 208 that are directed to the elliptical first reflector 202 may be reflected by the first reflector 202 as light rays 1154" toward the supplemental reflector 1150. Without the supplemental reflector 1150, these light rays 1154" would miss the proximate end 216 of the integrating device 210 and be outside the overfill region (thereby missing the second reflector 1130). This "miss" is illustrated by arrow 1156 that shows the continuation of light ray 1154" in the case without the supplemental reflector 1150. Light rays 1154" are reflected by the supplemental reflector 1150 back to the first reflector 202 as light rays 1154''', which are reflected by the first reflector 202 as rays 1154'''' and 1154''''' to the proximate end 216 of the integrating device 210.

The light source 208 generally includes a bulb having a bulb envelope and the supplemental reflector 1150 is connected to the end of the bulb envelope according to an embodiment of the invention. The supplemental reflector 1150 has a radius of aperture 1152 of about 4 mm and a radius of curvature of about 30 mm according to an embodiment of the invention.

In the embodiment of the invention illustrated in FIG. 11, the illumination apparatus includes an illumination relay 1160 for transmitting light from the distal end 222 of the integrating device 210 to the image-forming device 106. The illumination relay 1160 may include a system of lenses that images the light exiting the integrating device 210 for example onto a DMD or an optical modulator.

To implement an embodiment of the invention, one technique is to limit the size of the second reflector such that only those light rays from the Gupta illumination ring that fall into the overfill region around the proximate end of the integrating device are reflected. This ensures that the light that is reflected back to the first reflector goes to the Gupta illumination region re-reflected to another portion of the Gupta illumination region and back into the entry of the integration device. Using such a technique, an illumination device 200 according to an embodiment of the invention is constructed by providing a substantially elliptical first reflector having a first focal point and a second focal point that define an axis. A light source is positioned substantially at the first focal point. A second reflector is positioned so its center is substantially on the axis and an aperture through the second reflector is on the axis. The aperture through the second reflector has a maximum opening dimension and the radius of aperture of the second reflector is less than the maximum opening dimension of the aperture. The second reflector may be curved and its center of curvature is substantially on the axis. The curvature is chosen based on the parameters of the first reflector such that light incident to the surface of the second reflector is returned to the Gupta illumination region on the first reflector.

Although the embodiments of the invention described above include a light source, the source positioned substantially at the first focal point is not necessarily limited to those that generate visible light. In embodiments of the invention, the source positioned substantially at the first focal point more generally emanates electromagnetic radiation. This electromagnetic radiation may include at least one of infrared, visible, and ultraviolet light. Further, various embodiments of the invention my include filters in the electromagnetic path to remove one or more portions of the electromagnetic radiation. In an embodiment of the invention, the source emanates visible light having a wavelength in the range of about 450 nm to about 750 nm.

Although the embodiments of the invention described above include "reflectors," are substantially reflective and are not necessarily 100% reflective. In an embodiment of the invention, the first and second reflectors are approximately 98% reflective.

In an exemplary embodiment, the second reflector comprises a plurality of prisms or corner cubes to provide retroflection without the second reflector necessarily being curved. These prisms or corner cubes return the light incident on the second reflector back to the Gupta illumination ring where it is reflected to another portion of the Gupta illumination ring before being once again reflected to the entry at the proximate end 216 of the integrating device 210. The size of the second reflector remains limited to prevent light rays having a high angle of acceptance from being returned to the first reflector. The shape of the second reflector remains generally circular with an aperture opening. The aperture through the second reflector has a maximum opening dimension and the radius of aperture of the second reflector is less than the maximum opening dimension of the aperture.

Figure 12:
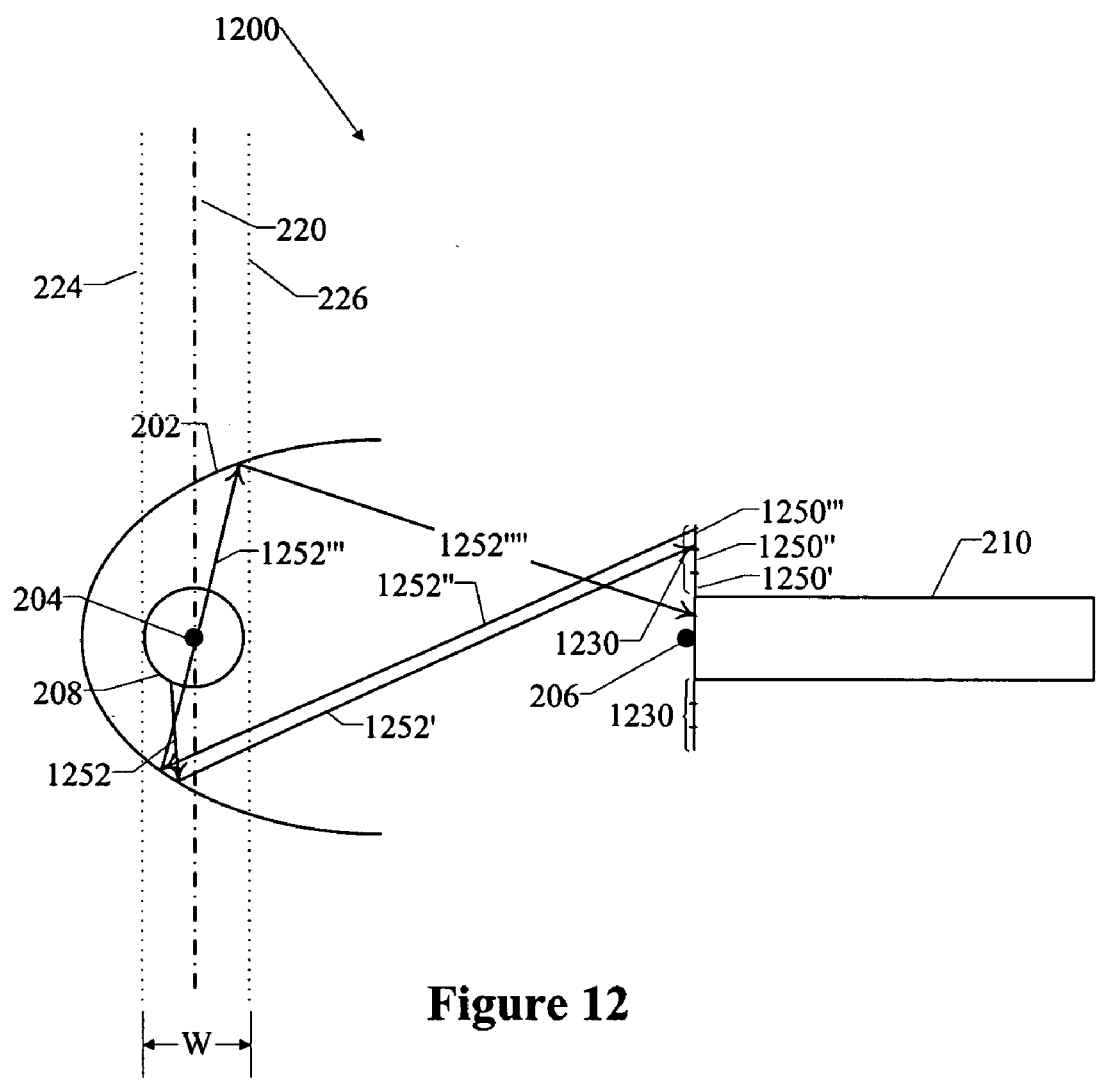
FIG. 12 is an illustration of an illumination apparatus having a second reflector comprising corner cubes according to an embodiment of the invention.
Figure 12A:
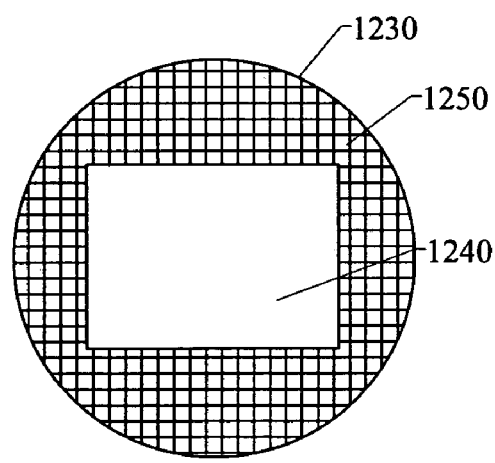
FIG. 12A is a front view of a second reflectors with corner cubes according to an embodiment of the invention.

Although embodiments of the invention are described as having a curved second reflector, the second reflector is not necessarily curved as illustrated with reference to the light collection system 1200 shown in FIG. 12. The second reflector 1230 in FIG. 12 includes a plurality of corner cubes 1250 according to an embodiment of the invention. There is shown FIG. 12A a front view of the second reflector 1230 that includes a plurality of corner cubes 1250 and an aperture 1240 through the second reflector.

The corner cubes 1250', 1250", 1250''' are positioned in a non-curved arrangement and each reflects light from the Gupta illumination ring of the elliptical reflector 202, slightly offset, back to the Gupta illumination ring. For example, light rays 1252 reflected by the first reflector 202 reflected as rays 1252' may miss the spatial homogenizer 210 and may be directed to the overfill region and to the second reflector 1230. The rays 1252' from the Gupta illumination ring that are directed to a corner cube 1250''' are reflected back to the Gupta illumination region as rays 1252" that are slightly offset from rays 1252'. These light rays 1252" are then reflected again by the elliptical first reflector 202 to another portion of the Gupta illumination ring before being directed toward the proximate end of the integrating device 210 as illustrated by light rays designated 1252''' and 1252''''.

Although the invention is described above with regard to its application in a projector, the invention is not limited to use in projectors. An illumination apparatus according to embodiments of the invention may be used in other applications such as lithography.

Although embodiments of the invention are described above with regard to a second reflector having a spherical surface, the surface of the second reflector may be conical, faceted or aspherical. For example, the second reflector may have a surface that is substantially elliptical, hyperbolic or parabolic but yet designed to substantially reflect light back to the Gupta illumination ring on the first reflector while maintaining the numerical aperture of a non-modified system.

The foregoing describes the invention in terms of embodiments foreseen by the inventors for which an enabling description was available, although insubstantial modifications of the invention, not presently foreseen may nonetheless represent equivalents thereto.

What is claimed is:

1. A light collection system, comprising:
a substantially elliptical first reflector defining first and second focal points on an axis and having an annular region encompassing the first focal point, the annular region having a width W that is the distance of its projection onto the axis in a direction perpendicular to the axis and the width W is less than or equal to about 1/20 of a distance Df between the first and second focal points;
a second reflector with an aperture through the second reflector on the axis, shaped and positioned to reflect electromagnetic radiation from the annular region on the first reflector back to the annular region for reflection to a different portion of the annular region and back to the aperture.

2. The light collection system of claim 1 wherein the first reflector has a radius of aperture, the aperture through the second reflector has a maximum opening and the second reflector has a radius of aperture less than the radius of aperture of the first reflector and less than the maximum opening.

3. The light collection system of claim 2 wherein the radius of aperture of the second reflector is less than about 10 mm.

4. The light collection system of claim 2 wherein the radius of aperture of the second reflector is between about 3 mm and about 8 mm.

5. The light collection system of claim 1 wherein the second reflector is curved with a radius of curvature (RC).

6. The light collection system of claim 5 wherein the curvature of the second reflector is substantially one of elliptical, spherical, hyperbolic and parabolic.

7. The light collection system of claim 5 wherein the curvature of the second reflector is substantially spherical, the aperture through the second reflector is substantially at the second focal point, and the second reflector has an RC between about 0.5 Df and about 1.5 Df.

8. The light collection system of claim 5 wherein the RC is between about 0.7 Df and about 0.8 Df.

9. The light collection system of claim 5 wherein the RC is between about 0.5 Df and about 0.9 Df.

10. The light collection system of claim 5 where the RC equals about 0.5 Df.

11. The light collection system of claim 5 where the RC equals about 60 mm and Df equals about 80 mm.

12. The light collection system of claim 5 wherein the RC is greater than about 50 mm.

13. The light collection system of claim 5 wherein the RC is between about 45 mm and about 60 mm.

14. The light collection system of claim 5 wherein second reflector has a sag less than about 1 mm.

15. The light collection system of claim 1 further comprising a color wheel between the first reflector and the second reflector.

16. The light collection system of claim 1 further comprising a spatial homogenizer having a proximate end positioned substantially at the second focal point and extending away from the first reflector to a distal end.

17. The light collection system of claim 16 wherein the proximate end of the spatial homogenizer has an outer edge and the second reflector substantially blocks radiation directed toward the outer edge of the spatial homogenizer.

18. The light collection system of claim 16 wherein the proximate end of the spatial homogenizer has a surface area between about 10 $mm^2$ and about 60 $mm^2$.

19. The light collection system of claim 16 wherein the proximate end of the spatial homogenizer has a surface area and the second reflector has a surface area about three times the surface area of the proximate end of the spatial homogenizer.

20. The light collection system of claim 1 wherein the second reflector is positioned so its aperture is located substantially at one of the second focal point, between the first reflector and the second focal point, and further away from the first reflector than the second focal point.

21. The light collection system of claim 1 wherein second reflector comprises a plurality of facets.

22. The light collection system of claim 1 wherein the second reflector comprises a plurality of prisms or corner cubes.

23. The light collection system of claim 1 wherein second reflector has a continuous surface other than the aperture.

24. The light collection system of claim 1, further comprising an electromagnetic source substantially positioned at the first focal point.

25. The light collection system of claim 24 wherein the electromagnetic source is replaceable.

26. The light collection system of claim 24, wherein the electromagnetic source has a shadow, further comprising a supplemental reflector positioned on the axis and in the shadow of the electromagnetic source.

27. The light collection system of claim 26, wherein the supplemental reflector is curved and is curved in the same direction as the first reflector.

28. The light collection system of claim 26, wherein the supplemental reflector is substantially one of elliptical, spherical, hyperbolic and parabolic.

29. The light collection system of claim 26, wherein the supplemental reflector comprises a plurality of facets.

30. The light collection system of claim 26, wherein the supplemental reflector comprises a plurality of prisms or corner cubes.

31. The light collection system of claim 27, wherein the supplemental reflector comprises a plurality of prisms or corner cubes.

32. The light collection system of claim 1 wherein the aperture of the second reflector is substantially centered on the axis.

33. A light collection system, comprising:
a substantially elliptical first reflector having a radius of aperture and defining a first focal point and a second focal point, wherein the first and second focal points define an axis; and
a second reflector having a substantially rectangular aperture with a maximum opening formed through the second reflector and on the axis, and a radius of aperture less than the radius of aperture of the first reflector and less than the maximum opening, wherein the second reflector is positioned to reflect electromagnetic radiation from the first reflector to the first reflector.

34. The light collection system of claim 33 comprising a source of electromagnetic radiation located substantially at the first focal point.

35. The light collection system of claim 33 wherein the source of electromagnetic radiation is replaceable.

36. The light collection system of claim 34, wherein the second reflector is curved and the source of electromagnetic radiation has a shadow, further comprising a supplemental reflector positioned on the axis and in the shadow of the source of electromagnetic radiation and curved in the same direction as the first reflector.

37. The light collection system of claim 33 wherein the second reflector is curved and has a center of curvature substantially on the axis.

38. The light collection system of claim 37 wherein the radius of aperture of the second reflector is less than about 10 mm and the second reflector has a substantially spherical surface.

39. The light collection system of claim 37 wherein the second reflector has a sag less than about 1 mm.

40. A light collection system, comprising:
a substantially elliptical first reflector defining a first focal point and a second focal point, wherein the first and second focal points define an axis and the first reflector has a numerical aperture NA;
a spatial homogenizer having a proximate end positioned substantially at the second focal point and extending away from the first reflector to a distal end; and
a second reflector having a center of curvature substantially on the axis and an aperture formed through the second reflector and on the axis, wherein the second reflector is positioned to reflect radiation from the first reflector to the first reflector and has a curvature such that substantially all of the radiation reflected from the second reflector back to the first reflector that enters the proximate end of the spatial homogenizer has a maximum angle of acceptance A substantially such that $\sin(A) \leq NA$.

41. The light collection system of claim 40 wherein the angular spread of radiation incident upon the aperture is substantially the same with as it is without the second reflector.

42. The light collection system of claim 40 wherein the second reflector has a sag less than about 1 mm and the apparatus comprises a color wheel between the first reflector and the second reflector.

43. The light collection system of claim 40 wherein $NA \leq 0.6$.

44. The light collection system of claim 40 wherein the second reflector has a radius of aperture less than a radius of aperture of the first reflector.

45. A light collection system, comprising:
a first reflector having a substantially elliptical surface with a radius of aperture, the first reflector defines a first focal point and a second focal point, which define an axis,
a source of light located substantially at the first focal point; and
a second reflector having a center of retroflection substantially on the axis, a substantially rectangular aperture having a maximum opening, formed through the second reflector and substantially centered on the axis, and a radius of aperture less than the radius of aperture of the first reflector and less than the maximum opening of the substantially rectangular aperture through the second reflector, wherein the second reflector is positioned to reflect light from a region of the first reflector to the same region of the first reflector.

46. A method, comprising:
providing a substantially elliptical first reflector having a radius of aperture, a first focal point and a second focal point along an axis; and
positioning a curved second reflector having a center of curvature and a substantially rectangular aperture having a maximum opening formed through the second reflector, where the second reflector is positioned so its center of curvature is substantially on the axis, its aperture is on the axis, its radius of aperture is less than the radius of aperture of the first reflector and less than the maximum opening of the substantially rectangular aperture through the second reflector.

47. The method according to claim 46 further comprising: positioning a proximate end of an integrating device substantially at the second focal point, the integrating device extends away from the first reflector from its proximate end to a distal end.

48. The method according to claim 46 further comprising: positioning a color wheel between the first reflector and the second reflector; and wherein the second reflector has a sag less than about 1 mm.

49. The method according to claim 46 further comprising: positioning a light source at the first focal point, the light source having a shadow; and positioning a supplemental reflector on the axis and in the shadow of the light source and curved in the same direction as the first reflector.

* * * * *